(12) United States Patent
Ronson et al.

(10) Patent No.: US 12,019,957 B2
(45) Date of Patent: *Jun. 25, 2024

(54) HANGER PLACEMENT FOR COMPUTER-AIDED DESIGN

(71) Applicant: EVOLVE MEP, LLC, Atlanta, GA (US)

(72) Inventors: David Ronson, San Marcos, TX (US); Xiao Chun Yao, Marietta, GA (US)

(73) Assignee: EVOLVE MEP, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,331

(22) Filed: Apr. 4, 2022

(65) Prior Publication Data

US 2022/0222390 A1     Jul. 14, 2022

Related U.S. Application Data

(63) Continuation of application No. 16/430,870, filed on Jun. 4, 2019, now Pat. No. 11,295,043.

(60) Provisional application No. 62/680,091, filed on Jun. 4, 2018.

(51) Int. Cl.
*G06F 30/13* (2020.01)
*G06F 3/04815* (2022.01)
*G06F 3/0484* (2022.01)
*G06F 111/20* (2020.01)

(52) U.S. Cl.
CPC .......... *G06F 30/13* (2020.01); *G06F 3/04815* (2013.01); *G06F 3/0484* (2013.01); *G06F 2111/20* (2020.01)

(58) Field of Classification Search
None
See application file for complete search history.

(56) References Cited

U.S. PATENT DOCUMENTS

2010/0149178 A1   6/2010   Yokoyama
2015/0169796 A1   6/2015   Sato

*Primary Examiner* — Syed A Roni
(74) *Attorney, Agent, or Firm* — Clayton, McKay & Bailey, PC

(57) ABSTRACT

Examples herein describe systems and methods for hanger placement for computer-aided design ("CAD"). A plugin can provide a hanger placement option on a graphical user interface ("GUI") of the CAD program. When the option is selected, the plugin can choose hanger locations on a run of ductwork or piping based on hanger parameters and collision detection. This can include testing hanger locations by building an array between the selected item and the ceiling of a plan in the GUI, and testing for collisions with other objects at each point in the array. If a collision is detected, a new hanger location is tested. The new hanger location can be selected based on the hanger parameters, such as by incrementing the interval between hangers while staying within a maximum interval.

17 Claims, 7 Drawing Sheets

FIG. 3B

HANGER SPECIFICATIONS

| PIPEWORK | DUCT - REC | DUCT - RND | DUCT - OVL |

| MATERIAL | SPEC | HANGER PLACEMENT ||| HANGER TYPE |
| | | SIZE <= | SPACING | FROM END | FROM JOINT | |
|---|---|---|---|---|---|---|
| CARBON STEEL | SCH 40 | 0' 2" | 10' 0" | 1' 0" | | CLEVIS |
| | | 0' 8" | 12' 0" | 1' 6" | | ROLLER CLEVIS |
| CAST IRON | NO-HUB | 1' 3" | 8' 0" | | 1' 0" | CLEVIS |

SAVE AS DEFAULT | IMPORT | EXPORT

OK | CANCEL | APPLY | HELP

HANGER PLACEMENT FOR COMPUTER-AIDED DESIGN

CROSS-REFERENCE TO RELATED APPLICATIONS

This application claims priority to and is a continuation of U.S. Pat. No. 11,295,043, titled "Hanger Placement for Computer-Aided Design," filed on Jun. 4, 2019, which claims priority to provisional application No. 62/680,091, titled "Hanger Placement for Computer-Aided Design," filed Jun. 4, 2018. These applications are each incorporated by reference in its entirety.

BACKGROUND

Computer-aided design ("CAD") software allows users to design structures for construction, among other things. One type of CAD software is Building Information Modeling ("BIM") software, which allows users to elaborately design three-dimensional structures. AUTODESK REVIT is one type of BIM software that can be used to design complex buildings all the way down to components and assemblies for use in a project. For example, a user can model an entire plumbing or electrical installation within a building.

BIM software often includes templates for conduit and other construction assemblies, allowing the designer to lay out conduit in the plan. REVIT templates for conduit and other components, such as plumbing or air conditioning ducts, can allow a user to draw a long run and easily visualize where the components will go.

However, hangers for pipe or ductwork are not implemented in a real-world manner. Hangers are an important part of laying out air conditioning ducts or pipe. Existing software does not include any means of accurately laying out the hangers, much less any determinations as to whether a potential layout would work or be up to code. In particular, hangers can be placed in a manner that intersects with interceding structures, such as pipes, conduit, or ducts, that are positioned between the ceiling and the structure being hanged.

Because of this limitation on current CAD and BIM technology, much time is spent in the field determining how to hang ducts or pipe based on other elements of the building. Sometimes a run of pipe or ducts must be rerouted, which can require reordering parts when the specific lengths and bends of the CAD-generated pipe or duct assembly no longer will suffice. Alternatively, the on-site construction can leave hanger placement completely up to field workers, who might not place hangers close enough together to provide adequate support to a duct or pipe assembly.

Therefore, a need exists for a system that can resolve hanger placement accurately and automatically within a BIM system, including within current BIM systems such as REVIT that do not natively provide this functionality.

SUMMARY

Examples described herein include systems and methods for hanger placement in a CAD program, such as REVIT. The CAD program can execute with a plugin that includes functionality for collision detection in an example. The plugin can utilize hanger parameters stored in a database to determine where to attempt to place hangers and test for collisions.

In one example, the method can include providing an option on a graphical user interface ("GUI") to place a hanger. The GUI can be generated by the CAD program but manipulated by the plugin, in an example. The option can be, for example, a button to perform hanger placement. A user can select one or more items on the GUI for which hanger placement should be determined. Alternatively, if the button is pressed without an existing item selection, the plugin can select the item(s) for hanger placement based on item type. For example, ductwork and pipes can be detected and chosen by the system as the selected item. The selected item can be one or more of many items represented in a model used for construction, such as a floorplan.

The plugin can place a starting hanger at a default location, such as by starting at a location specified by the hanger parameters. This can be, for example, the left-most point of the selected item, offset by some distance. If this location is open (no collision is detected), the starting hanger can be placed there. Otherwise the plugin can begin testing locations at intervals to the right of the default location for placing the starting hanger.

Additional hangers can then be placed in series based on the intervals from the adjacent hangers. For example, a first hanger can be placed adjacent to the starting hanger by testing a first hanger location based on the hanger parameters. In particular, this can include testing for collisions. To do this, the plugin can create an array of points between the selected item and the ceiling, beginning at the first location. Contemporaneously or afterward, the plugin can check each point for a collision with another object represented in the model. This can include making calls to an application programming interface ("API") of the BIM or CAD software and receiving an indication in return of whether an object already exists at the particular point.

When the plugin detects a first collision in the array based on another object (also called a structure), the plugin can adjust placement of the first hanger to a second hanger location where no collisions exist. This can include incrementally moving the start point for the array down the span of the selected item and continuously testing the array for collisions. The second hanger location can be kept within a maximum interval specified in the hanger parameters to ensure that the selected item (e.g., ductwork or piping) can still be reliably hung in a real-world setting in a manner that conforms with building codes. For example, the maximum interval can be different based on the item type, such as type of ductwork or pipe. The maximum interval can reflect code requirements for the different item types.

Once the second hanger location is determined based on lack of collisions in the array, the plugin can cause the CAD software to place the first hanger at the second hanger location. The GUI can visually show a hanger at the second hanger location.

This process can continue for the entire span of the selected item. For example, third and fourth hangers can be placed along the same pipe or duct following the spacing rules of the hanger parameters and the collision detection described. When the end of the selected item is reached, the hanger placement function of the plugin can end.

The method can be described by instructions in a non-transitory, computer-readable medium. A processor can execute the instructions in a system.

Both the foregoing general description and the following detailed description are exemplary and explanatory only and are not restrictive of the examples, as claimed.

BRIEF DESCRIPTION OF THE DRAWINGS

FIG. 3B is an example illustration of a GUI screen.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In an example, an option is provided within a CAD or BIM program, such as REVIT, to create hangers for certain object types, such as ducts or pipes, that are meant to hang from the ceiling. A plugin can provide a button for running this functionality within a GUI where a design layout is displayed. The design layout can include multiple parts and assemblies within, for example, a floorplan. It can be used to layout objects for a construction project, for example.

The plugin can select hanger locations based on hanger parameters stored in a database. However, before merely placing the hangers, the plugin can also check for collisions and adjust the hanger placements when necessary.

Figure 1:
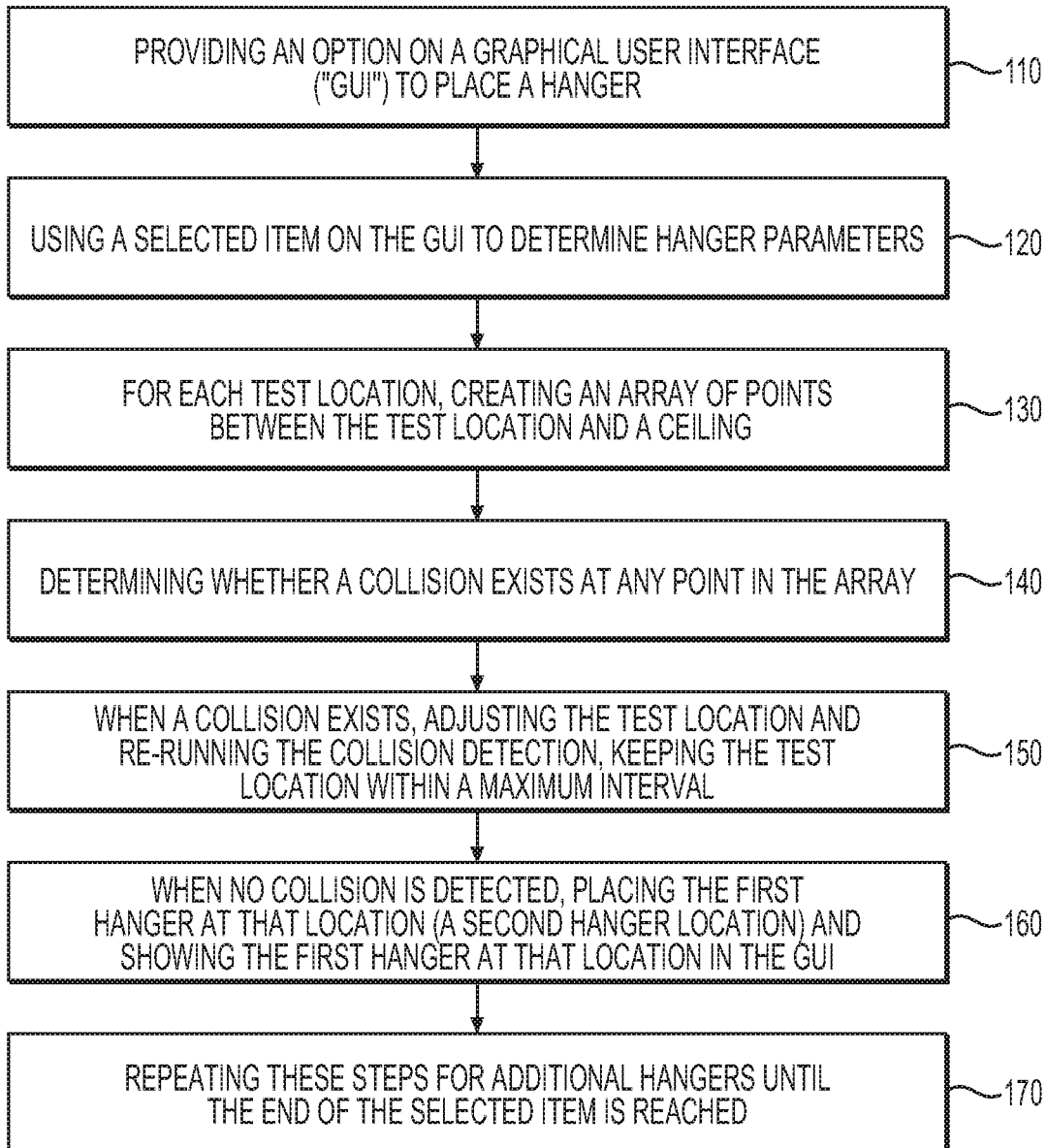
FIG. 1 is a flowchart of an example method for performing hanger placement in a BIM software environment.

FIG. 1 is an example method for hanger placemen. At stage 110, a plugin can execute as part of a BIM program, such as REVIT, can provide an option on a GUI to place hangers. This can include providing a button on the GUI or a drop-down menu item. The button can cause the system to place hangers on a selected item according hanger parameters.

At stage 120, the plugin uses a selected item on the GUI to retrieve hanger parameters, which can differ for different selected items. The selected item can be one or more parts manually selected on the GUI by a user. For example, the user can click one or more parts or draw a box around multiple parts on the GUI.

Alternatively, the plugin can automatically select the items based on determining which parts and assemblies on the GUI meet qualifying object types. For example, certain pipes and ductwork can have object types that the plugin recognizes for purposes of applying hangers. That can be because these object types are routinely hung from the ceiling in a design layout or construction project.

In one example, the plugin determines selected items based on multiple criteria. This can be done to use only a subset of the user's selection as the selected item, in an example. For each part in the user's selection (or if no user selection exists, the entire GUI screen), the plugin can determine part type. This can include comparing part associations with REVIT families in one example. For example, if the REVIT family for a part is "MEP Fabrication Pipework," the plugin can determine that the type is a pipe. If the family is instead "MEP Fabrication Ductwork," then the part type can be a duct.

A multi-level analysis can provide a more exact part type. For example, connectors can be analyzed to determine if the duct is rectangular, circular, or oval based on corresponding information about the connector. Part material (e.g., type of metal or thickness) can indicate a specific type of pipe or duct. A specification ID can also be matched by the plugin against a database to determine the part type.

In one example, size is used to determine parts that will remain part of the selected item for analysis purposes. For example, the plugin can first group sizes of all parts in the selected item from lowest to highest. Then each can be evaluated in a loop such that only the correct sized parts are kept as part of the selected item. If no size match has been found by the time all configured sizes have been checked, no hanger placement rules are applicable.

Based on the selected item, at stage 120, the plugin can also retrieve hanger parameters. This can include retrieving information regarding hanger spacing, hanger type, and maximum spacing intervals, and the like, based on the determined part type. As an example, a carbon steel pipe can have different hanger parameters than a cast iron pipe. Different ducts can have different hanger parameters than other types of ducts or pipes.

Hanger parameters can include hanger size, spacing, and distance from the end of the part. Hanger parameters can also specify a distance from a joint since stability may be worse at a joint than in a continuous run of pipe or duct. The hanger parameter can also specify hanger type, which can be used to physically represent the hanger on the GUI.

Other hanger parameters specify collision rules. For example, a maximum interval can specify the maximum span between two adjacent hangers. In one example, the maximum interval can be a maximum movement value, specifying how far from the ideal spacing interval the hanger can be moved in an attempt to avoid collisions. A test interval value can specify how far a hanger placement is moved after detecting a collision before testing again for collisions. The hanger parameters can also provide a default start point for a hanger, from which the hanger placement and collision rules can be applied. These can be referend to as test locations or hanger placement locations.

At stage 130, the plugin can create an array of points between the hanger placement (test) location and a ceiling. This array is used to test whether a hanger would collide with some other part located between the hanger placement location and the ceiling. The array can be two-dimensional or three-dimensional, depending on the example. For example, the array can be constructed by the plugin to emulate the width of the connector being used at the hanger placement location, in an example.

Because an individual hanger placement is dependent upon the placement of the previous, in order to create a consistent and predictable pattern the placement of the initial hanger can be determined from the hanger parameters. In one example, all end points (which is defined as a part which does not have an adjacent part selected or is the last part in the run) are fetched for the selected item. It is possible that this could be greater than two end points due to branching or could be one end point in the event a single item is selected. In one example, the size value of each end point is determined. Initial placement can then be prioritized by: (1) largest size value, (2) lowest X-axis position value in the model; and (3) lowest Y-axis position value in the model.

At stage 140, the plugin can use the array to determine if a hanger at the hanger location would collide with some other part above the selected item. To do this, for each point in the array, the plugin can make an API call to the BIM software to request part information based on the point location. If a part is identified, then a collision exists. However, if no part is identified for any of the points in the array, then no collision exists. The points in the array can have spatial coordinates in one example. These coordinates can be passed to the BIM software as part of the API call.

In one example, a separate API call is made for each point in the array. In another example, the entire array can be provided to the BIM software as part of an API call, and the software can check all of the points and return part IDs for any part that intersects with any of the points.

At stage 150, when a collision exists, the test location (hanger placement location) can be adjusted according to the hanger parameters. For example, a test interval can be added to the first hanger placement, moving it down the length of the pipe or duct from left to right. If the maximum interval has not been exceeded, then the collision analysis of stages 130 and 140 can be repeated at the new test location. The hanger placement location can be moved repeatedly if the array keeps intersecting with one or more parts between the hanger placement location and the ceiling, so long as the maximum interval is not exceeded.

At stage 160, when no collision is detected, the current hanger location is used for placing the hanger. Thus, a second hanger location may be used when a first hanger location has a collision. The hanger can be visually depicted on the GUI at the second hanger location.

At stage 170, the method can return to stage 130 and place a second hanger offset from the first hanger. The offset can be specified by the hanger parameters. However, as described in stages 130-150, when a collision exists, the hanger placement for the second hanger can also be shifted until, at stage 160, no collision exists. This same process can repeat again and again until the end of the selected item has been reached.

Other hanger placement rules can also be involved. For example, hanger offsets for joints or bends can ensure that a hanger is not placed on the joint or bend itself.

Figure 2:
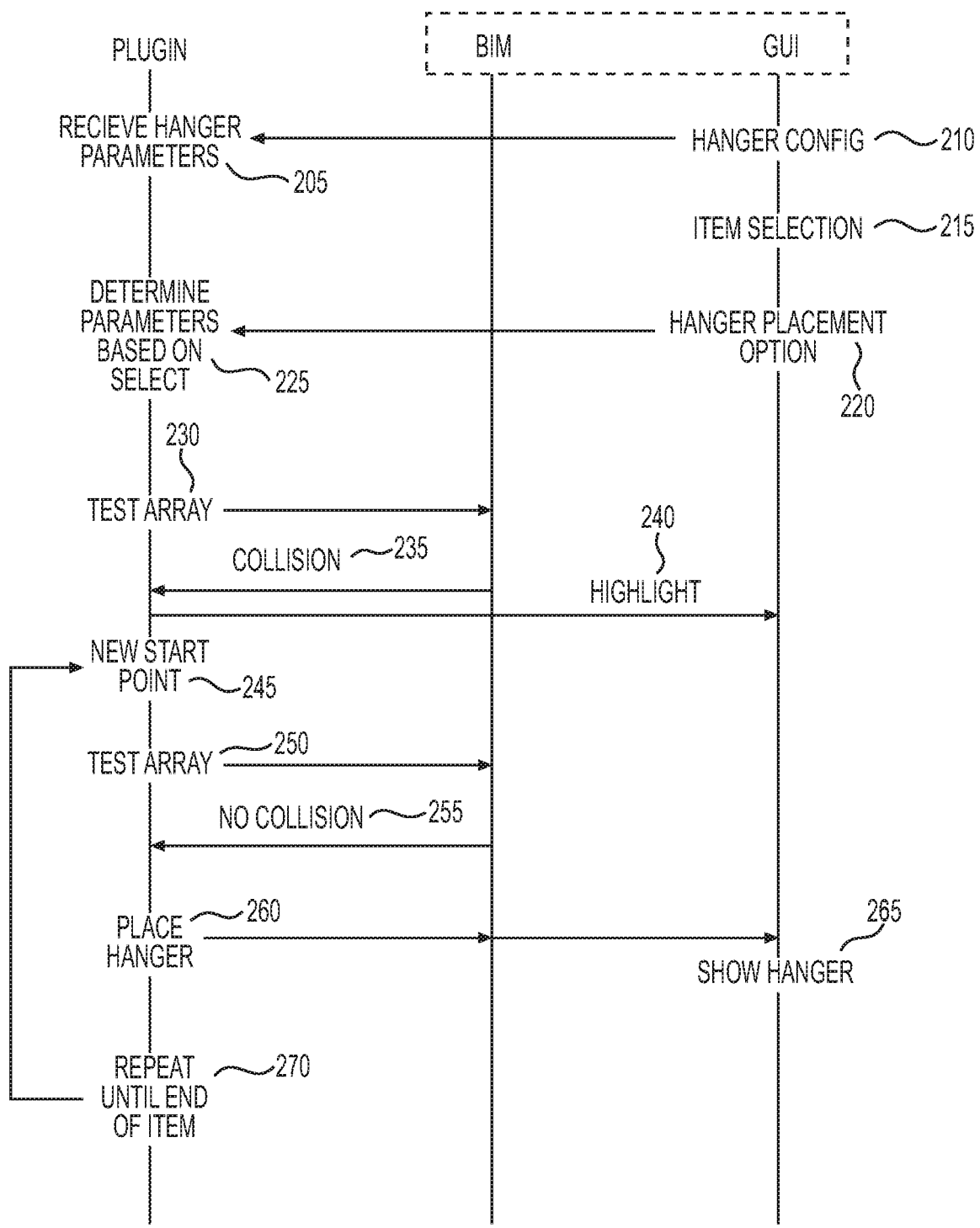
FIG. 2 is a sequence diagram of example steps for hanger placement.

FIG. 2 is a sequence diagram describing the hanger placement in an example. At stage 205, the plugin can receive hanger parameters. This can be based on importing a file of hanger parameters for various different part types. Alternatively, or in addition, the user can use a hanger configuration screen at stage 210. The hanger configuration screen can allow the user to set hanger parameters, including collision detection options.

Hanger parameters can be saved within a REVIT model in one example. This can allow effective hanger placement parameters to "travel" with the model not change unless a user makes updates via the hanger configuration screen. The hanger parameters can be stored in XML format in one example. This can be done so that the hanger parameters are easily serializable for working with programmatically as well as persisting to storage.

The exact hanger parameters can vary between examples. Some example collision-related hanger parameters are shown below in Table 1, and some placement rule hanger parameters are shown below in Table 2, along with example corresponding data format:

TABLE 1

Collision Hanger Parameters

| Configuration Field | Data Format |
|---|---|
| Hanger Collision Automatic Adjustment Interval | Decimal number (inches) |
| Hanger Collision Automatic Adjustment Maximum Movement | Decimal number (inches) |
| Hanger Collision Automatic Adjustment Enabled (On/Off) | Boolean |
| Clash Detection Highlight Color | Color |

TABLE 2

Placement Hanger Parameters

| Configuration Field | Data Format |
|---|---|
| Type | Text string (available values are predefined/hard coded) |
| Material | Text string (exact display name match) |
| Spec | Text string (exact display name match) |
| Hanger type | Text string (exact display name match) |
| Size Range | Decimal number (inches) |
| Straight Spacing | Decimal number (inches) |
| Spacing Before/After End | Decimal number (inches) |
| Spacing Before/After Joint | Decimal number (inches) |

At stage 215, the user can optionally select an item. This can include drawing a box around multiple parts to treat as the selected item. Then at stage 220, the user can select the hanger placement option, such as a button or drop-down item.

In one example, the plugin determines the selected item in response to the user selecting the hanger placement option at stage 220. For example, the plugin can determine which of the selected parts meet the criteria for hanger placement. As described above, this can be done based on part type, material, size, or ID numbers such as Specification numbers.

At stage 225, the plugin can determine the hanger parameters that apply to the selected item (e.g., the run of parts). In one example, when the place hanger functionality is invoked, the application (e.g., plugin) will scan all material and specification combinations used and report back any missing combination. This will be a soft warning which the user can either: (1) confirm they want to ignore and continue with the hanger placement process; or (2) cancel the hanger placement process. As an example, the user can the user can run the command to place hangers at stage 220 and select the run which they should be placed on at stage 215. The application can detect that this run uses: (1) Carbon Steel material/Schedule 40 specification; and (2) Cast Iron material/No-Hub specification. The hanger placement parameters (e.g., in a database) are scanned for definitions of all the detections. In this example, no definition is found for the Cast Iron/No-Hub combination. The GUI can then prompt the user that the selected run (i.e., selected item) includes this combination but no configuration information is found. At this point the user can select if they wish to continue anyway or cancel the placement (e.g., so they can either adjust their run selection or update the configuration information).

The retrieved hanger parameters are then used to place the hangers.

At stage 230, a hanger location is tested for collisions and other fitness based on placement according to the hanger parameters. In one example, hangers are only placed on straights. This can be identified, in one example, by the part having an instance property value IsAStraight. If this value is false, then the selected item is not eligible to have a hanger placed on it, in an example. Other retrieved hanger parameters regarding straight spacing, nearness to endpoints, and nearness to joints can be applied, such as:

Straight Spacing=8'
Spacing Before/After End=1'
Spacing Before/After Joint=6"

Additionally, when a branch is encountered on the selected item, the placement of hangers can follow rules based on the resulting direction from the branch, such as (1) the continuation of the straight (that is when there is no change of direction from the branch) resumes hanger placement on normal interval; and (2) any change of direction places a hanger on the defined end spacing on the resulting branch direction. As an example, if a hanger is placed on a straight and 2' down the straight a tee is encountered, hangers can be placed:

6' down the straight continuation from the tee; and
    1' from the branch of the tee (due to the end spacing setting).

Parts that qualify for this kind of rule can be identified by a predefined list of part values. Rules can also exist for when an elbow is encountered, such as treating the elbow as the end of the straight that feeds into it. Likewise, the straight originating from the elbow bend can be considered the beginning of its run. In example, a rule specifies that if an elbow is encountered 5' after the last hanger, a hanger must be placed 4' after the last hanger (for the 1' end spacing) and another hanger 1' after the elbow bend (for the 1' begin spacing).

In addition to picking a valid hanger placement, the plugin can test an array at stage 230 to determine if a collision exists. A collision would exist where the rod of a hanger touches or clashes with any element other than a structural element (e.g., the ceiling). A collision would also exist if the hanger is not placed on a valid part.

To detect a collision, the plugin can build an array from the hanger placement location to the structural element. Each point in the array can have a spatial coordinate. Those coordinates can be checked against other parts in the model to see if a collision exists. To do this check, the plugin can make an API call to REVIT or another BIM software.

At stage 235, a collision is detected. In one example, when a collision is detected, the plugin can select a new start point at stage 245. For example, the new start point can be adjusted backwards from the prior attempted hanger placement location (for example, such that the next hanger placed does not exceed the 8' spacing rule) by a configured adjustment value (for example, 6"). Then a new array is tested at stage 250 to see if a collision exists at this new location. This can be done continually until a collision is no longer detected at stage 255. After this placement adjustment is made, subsequent hanger spacing resumes as normal.

As an example, a collision can be detected at the normal 8' interval specified by hanger parameters. The hanger can then be moved back 6" (another hanger parameter) and a collision is again detected. It is then moved back another 6" (1' total which is under the configured 4' threshold) and another collision is detected. It is moved back another 6" (1'6" total which is under the configured 4' threshold) and no collision is detected. The net result is now that the hanger is placed 6'6" from the last. The hanger placement then resumes as normal with the next hanger placed 8' away.

Additionally, the plugin can cause the GUI to highlight the part that would have collided with the hanger placement if not for the automatic adjustment. This can allow the user to discern that the adjustment was made, in case the user would prefer to move the offending part. In the event that adjustments made exceed a configured threshold (for example, 4') then hanger adjustments for this placement attempt can be aborted and a different highlighting used to indicate the failure. In one example, the hanger can be placed at its normal specified interval (e.g., 8')—knowing this is a collision. Based on highlighting the part or otherwise alerting the user, the user will know to resolve this situation manually. The plugin can then cause the GUI to highlight such an event with a special color, such as red, at stage 240. This can allow the user to easily see that they need to intervene. Highlights can be turned on and off in an example. For example, a button for detecting clashes can show highlights, whereas a button to clear clashes can clear the added highlighting.

In one example, placement rules can dictate that hangers are to be placed on horizontal elements only. Horizontal can be defined by any element that has a rise over run that is equal to or less than a quarter inch per foot. Any element with a slope greater than ¼" per 1' will be considered vertical and shall be ignored for hanger placement. Other part-specific collision rules can also apply. For example, in the event, during normal spacing, a hanger is placed on a joint, hanger parameters can specify that it be moved backwards (e.g., 2") to avoid placement on the joint.

After the movements are complete and no collision exists at stage 255, the hanger can be placed on the GUI at stage 260. This can be done by an API call to the BIM software, which can then show the hanger on the GUI at the hanger location at stage 265.

Then at stage 270, the process can select the new start point at stage 245 for the next hanger. The start point can be based on the default spacing interval and adjusted accordingly if a collision exists.

Figure 3A:
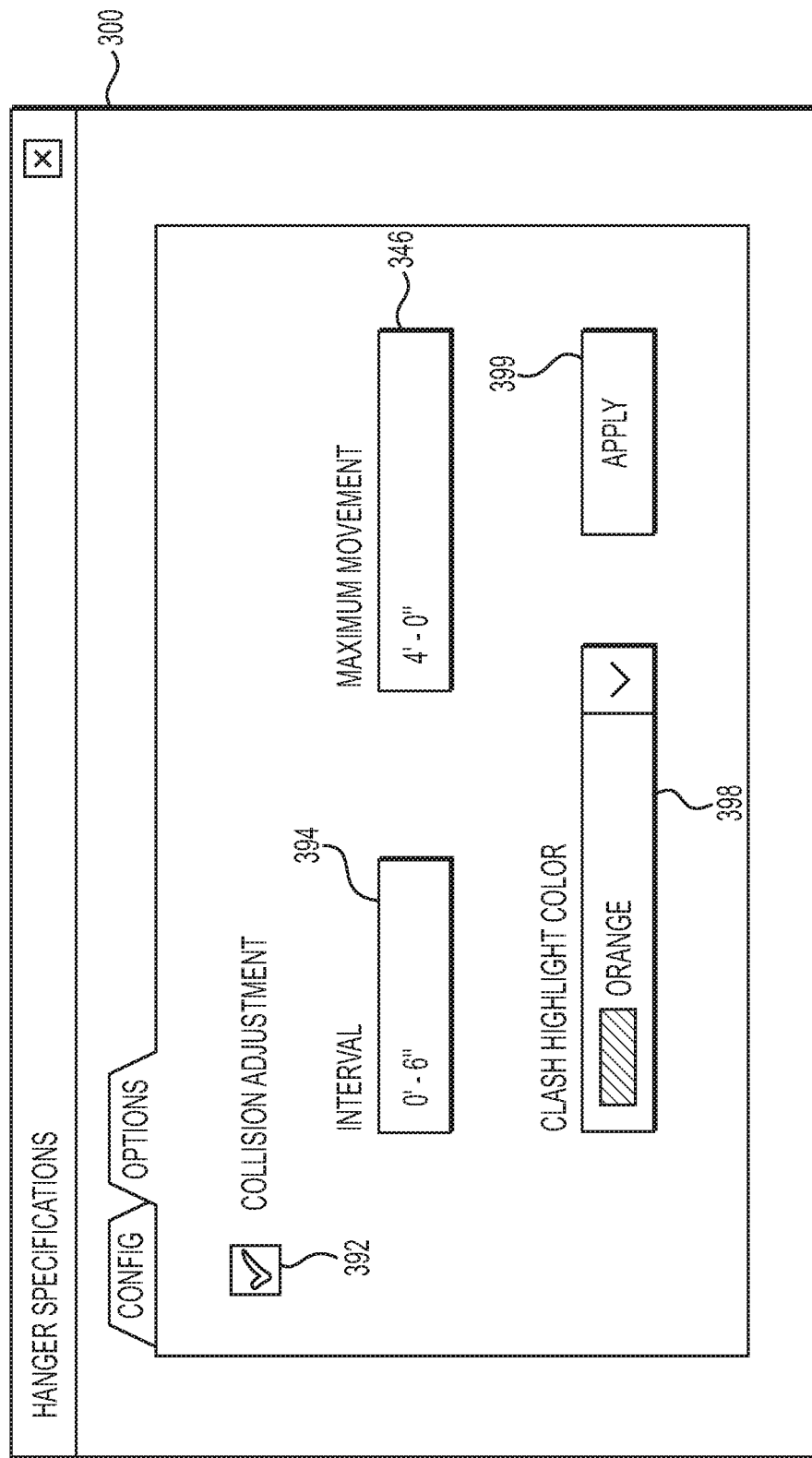
FIG. 3A is an example illustration of a GUI screen.

FIG. 3A shows an example GUI screen 300 for setting collision-related hanger parameters. This GUI screen 300 can be part of the hanger configuration described for stage 210 of FIG. 2. In this example, an options tab 390 has been selected. This tab includes an option 392 to turn on or off collision adjustment. Additionally, a maximum movement field 396 specifies the maximum amount that the hanger placement location can be moved before the plugin aborts. A movement interval filed 394 specifies how much to move backwards from the prior hanger placement location when a collision is detected. Additional fields, such as clash highlight color 398, can also be available. The user can customize these fields 394, 396, 398 in an example to specify how collision adjustments are handled. When the user is satisfied, they can apply their settings using the "apply" button 399.

FIG. 3B is an example illustration of the GUI screen 300 when the hanger configuration tab ("config" from FIG. 3A) is selected. The configuration screen 300 can include tabs or drop downs for multiple different part types 302. In this example, the pipework 304 part type is selected, revealing various part attributes, such as material 306 and Specification 308, and various placement hanger attributes, such as size 310, spacing 312, space from end 314, space from joint 316, and hanger type 318. Additionally, a view of the part and hangers is provided at graphic 330.

In one example, the user can modify some or all of the hanger parameters and hit a button 332 to accept the changes. These can also be saved as a default using button 320. Alternatively, the user can import hanger parameters for parts using the import button 322 and selecting a saved parameter file. Likewise, the user can export the hanger parameters to file using the export button 324.

As shown in FIG. 3B, different part attributes 306, 308 can specify different hanger parameters. In this example, the part attributes can provide an index for which the actual hanger placement parameters (e.g., rules) are defined against. Additionally, multiple different hanger types can be used for a single part type, and those can have different hanger parameters.

Figure 3C:
FIG. 3C is an example illustration of a GUI screen.

FIG. 3C illustrates the configuration GUI screen 300 after the Duct-Rect tab 340 has been selected. As shown, new materials 360 and hanger parameters 342 can populate based on settings for the rectangular ducts. The placement hanger parameters 342 can be based on material type: Pipe, Duct—Rectangular, Duct—Round, and Duct—Oval. The graphics 350 likewise can update. The user can change these parameters and again apply them with a button 352.

Figure 3D:
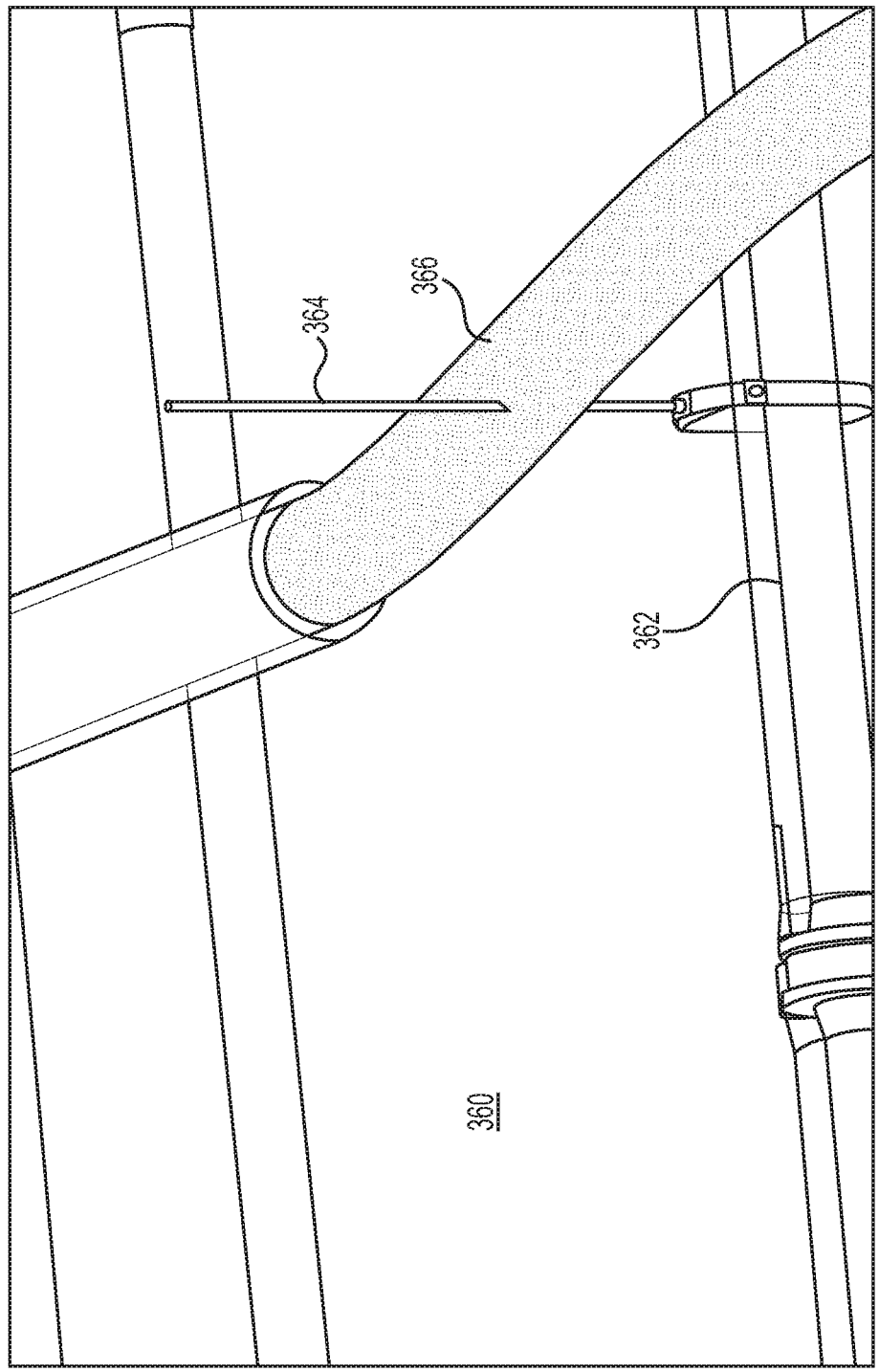
FIG. 3D is an example illustration of a GUI screen.

FIG. 3D is an example illustration of a GUI screen 360 showing a highlighted collision. In this example, a selected item 362 has a hanger 364 placed such that it collides with part 366. Part 366 can then highlight to show the user the collision. If collision adjustment is turned on (e.g., using setting 392 of FIG. 3A), then the placement of hanger 364 can be automatically adjusted to avoid the collision. In that instance, the part 366 can highlight different to indicate a collision was avoided than it would highlight to indicate the collision was not avoidable.

Figure 4:
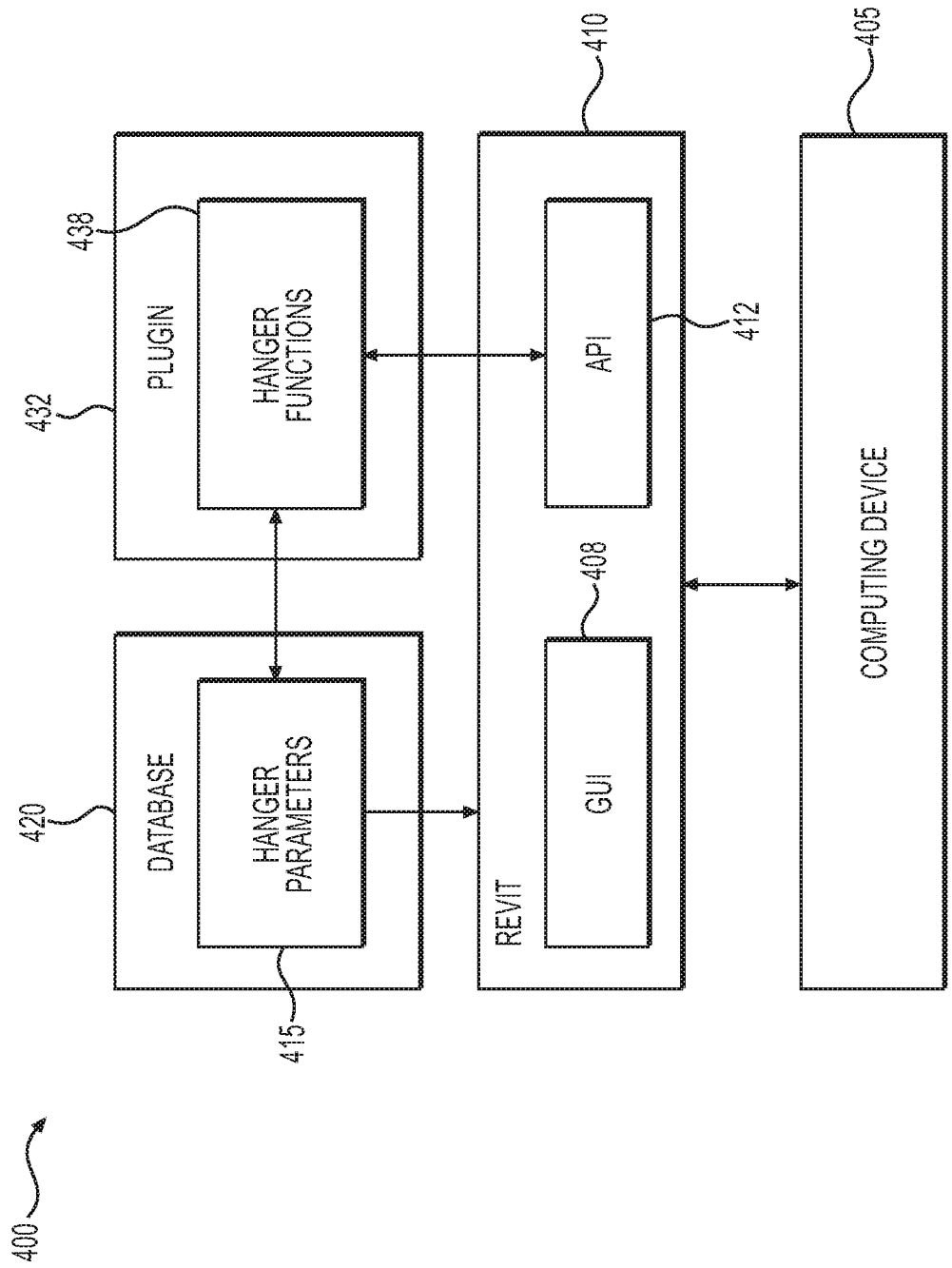
FIG. 4 is an example system diagram including example components for hanger placement in a CAD environment.

FIG. 4 includes an exemplary diagram of a system 400 in accordance with an example. REVIT 410 or another BIM program can execute on a computing device 405. The BIM program, such as REVIT 410, includes a GUI 408 used to create and display a design layout. Using REVIT 400, designers can create models of nearly any type of physical object, including dwellings and other structures. In one example, electrical, plumbing, or HVAC assemblies can also be designed. Although REVIT 410 is used as an example, the disclosure applies to other BIM or CAD programs as well.

The computing device 105 can be any processor-based device, such as a personal computer, laptop, tablet, or cell phone. It can also include or be part of a server in one example. The computing device 405 can display the REVIT 410 GUI 408 by executing a set of instructions stored locally or remotely on a computer-readable medium. The computing device 405 can also execute the plugin 432 in one example. In another example, the plugin 432 can be an application that executes remotely on a server that is accessed by the computing device 405. The plugin 432 can be executed as part of REVIT 410 or another CAD or BIM application.

The plugin 432 can improve the GUI 408 of REVIT 410 or another BIM application. For example, the plugin 432 can allow the REVIT 410 GUI 408 to display options and screens for automatically providing hangers and adjusting hanger positions based on collisions. For example, the GUI 408 can display screens for placement- and collision-related hanger parameters. The user can modify these on the GUI 408. The user can also select parts, such as horizontal pipe or duct runs, to which the hanger placement functions will apply.

In one example, a database 420 stores the hanger parameters 415. The hanger parameters 415 can be imported and exported into different REVIT 408 projects in one example. The hanger parameters 415 can ensure proper hanger placement locations and spacing based on different part types and materials. For example, the hanger parameters 415 can account for part lengths, widths, bends, and connector information.

The plugin 438 can make API calls 412 to REVIT for a variety of purposes, including checking for collisions. In one example, the plugin 438 creates an array of points between a hanger placement location and a structural member, such as the ceiling. Those points are checked for collisions by making API calls, in an example.

The database 420 can be implemented by any type of computing device. In one example, the database 420 is part of computing device 405. In another example, the database 420 is remotely accessible by the computing device 405, such as over a network. The network can be a local area network, an enterprise network, or the Internet. In one example, multiple computing devices 405 in an enterprise can remotely access the database 420 over the network. This can allow for centralized storage of the hanger parameters 415, allowing for some administrative users to optimally set the parameters that are then available for other users to implement in projects.

Using the API, REVIT 410 can execute custom methods for the plugin 432 when certain events occur within REVIT 410. Custom methods can include new procedures that are part of plugin 432. Events are generated when an action is submitted to a REVIT 110 server for performance by REVIT 410. The plugin 432 can implement the events to cause REVIT 110 to communicate with the plugin 432. The plugin 432 then can execute custom methods for customized functionality.

The plugin 432 can further provide features for outputting the hanger placements, such as in a comma-delimited file. This can allow workers in the field to correctly place the hangers during part installation.

Although a plugin 432 is used in a preferred example, in another example the same functionality is built into the BIM application itself. All of the examples still apply to that configuration.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system for hanger placement in a computer-aided design ("CAD") application, including:
   a database that stores hanger parameters;
   a processor that executes instructions to perform stages comprising:
      providing an option on a graphical user interface ("GUI") to place a hanger;
      retrieving the hanger parameters based on a selected item, the selected item including a part on the GUI;
      testing a first hanger location based on the hanger parameters, including:
         creating an array of points between the first hanger location and a ceiling; and
         detecting a first collision in the array with another structure;
      adjusting placement of the first hanger to a second hanger location to eliminate the first collision, wherein adjusting placement of the first hanger includes adding to a default interval along a span of the selected item, and wherein a third hanger location is tested between the first and second hanger locations, wherein another collision is detected at the third hanger location, and wherein adding to the third hanger location results in the second hanger location; and
      placing the first hanger at the second hanger location, wherein the first hanger is shown in the GUI at the second hanger location.

2. The system of claim 1, wherein the stages further comprise:

displaying a hanger configuration interface on the GUI that allows entry of default and maximum hanger placement intervals; and storing the hanger configuration as part of the hanger parameters.

3. The system of claim 2, wherein the first hanger location is selected based on the default hanger interval relative to an existing hanger, and wherein the second hanger location is selected based on adding distance to the default hanger interval without exceeding the maximum hanger interval.

4. The system of claim 1, wherein the stages further comprise:

providing, on the GUI, options to import and export the hanger parameters.

5. The system of claim 1, wherein the stages further comprise:

displaying, on the GUI, highlighting that indicates the first collision; and providing a button on the GUI for clearing the highlighting.

6. The system of claim 1, wherein the selected item is a duct.

7. A non-transitory, computer-readable medium including instructions for hanger placement in a computer-aided design ("CAD") application based on hanger parameters, a processor executing the instructions to perform stages comprising:

providing an option on a graphical user interface ("GUI") to place a hanger;

retrieving the hanger parameters based on a selected item, the selected item including a part on the GUI;

testing a first hanger location based on the hanger parameters, including:

creating an array of points between the first hanger location and a ceiling; and detecting a first collision in the array with another structure;

adjusting placement of the first hanger to a second hanger location to eliminate the first collision, wherein adjusting placement of the first hanger includes adding to a default interval along a span of the selected item, and wherein a third hanger location is tested between the first and second hanger locations, wherein another collision is detected at the third hanger location, and wherein adding to the third hanger location results in the second hanger location; and placing the first hanger at the second hanger location, wherein the first hanger is shown in the GUI at the second hanger location.

8. The non-transitory, computer-readable medium of claim 7, wherein the stages further comprise:

displaying a hanger configuration interface on the GUI that allows entry of default and maximum hanger intervals; and storing the hanger configuration as part of the hanger parameters.

9. The non-transitory, computer-readable medium of claim 8, wherein the first hanger location is selected based on the default hanger interval relative to an existing hanger, and wherein the second hanger location is selected based on adding distance to the default hanger interval without exceeding the maximum hanger interval.

10. The non-transitory, computer-readable medium of claim 7, wherein the stages further comprise:

providing, on the GUI, options to import and export the hanger parameters.

11. The non-transitory, computer-readable medium of claim 7, wherein the stages further comprise:

displaying, on the GUI, highlighting that indicates the first collision; and providing a button on the GUI for clearing the highlighting.

12. The non-transitory, computer-readable medium of claim 7, wherein the selected item is a duct.

13. A method for hanger placement in a computer-aided design ("CAD") application based on hanger parameters, comprising:

providing an option on a graphical user interface ("GUI") to place a hanger;

retrieving the hanger parameters based on a selected item, the selected item including a part on the GUI;

testing a first hanger location based on the hanger parameters, including:

creating an array of points between the first hanger location and a ceiling; and detecting a first collision in the array with another structure;

adjusting placement of the first hanger to a second hanger location to eliminate the first collision, wherein adjusting placement of the first hanger includes adding to a default interval along a span of the selected item, and wherein a third hanger location is tested between the first and second hanger locations, wherein another collision is detected at the third hanger location, and wherein adding to the third hanger location results in the second hanger location; and placing the first hanger at the second hanger location, wherein the first hanger is shown in the GUI at the second hanger location.

14. The method of claim 13, further comprising:

displaying a hanger configuration interface on the GUI that allows entry of default and maximum hanger intervals; and storing the hanger configuration as part of the hanger parameters.

15. The method of claim 14, wherein the first hanger location is selected based on the default hanger interval relative to an existing hanger, and wherein the second hanger location is selected based on adding distance to the default hanger interval without exceeding the maximum hanger interval.

16. The method of claim 13, further comprising:

providing, on the GUI, options to import and export the hanger parameters.

17. The method of claim 13, further comprising:

displaying, on the GUI, highlighting that indicates the first collision; and providing a button on the GUI for clearing the highlighting.

* * * * *